(No Model.)
F. SCHELP, Jr.
VEHICLE SPRING.
No. 440,063.　　　　　　　　　Patented Nov. 4, 1890.
FIG. I.
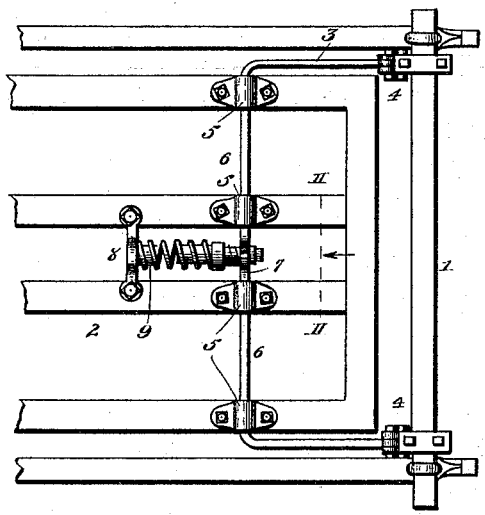
FIG. II.
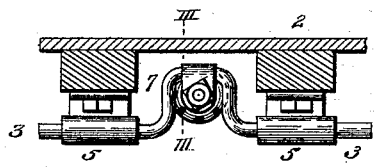
FIG. III.
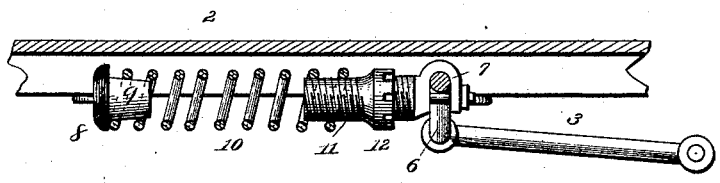
Witnesses:
Harry S. Rohrer.
Walter Allen
Inventor:
Frederick Schelp, Jr.
By Knight Bros.
Attorneys.

UNITED STATES PATENT OFFICE.

FREDERICK SCHELP, JR., OF ST. LOUIS, MISSOURI.

VEHICLE-SPRING.

SPECIFICATION forming part of Letters Patent No. 440,063, dated November 4, 1890.

Application filed April 26, 1890. Serial No. 349,673. (No model.)

*To all whom it may concern:*

Be it known that I, FREDERICK SCHELP, Jr., of the city of St. Louis, in the State of Missouri, have invented a certain new and useful Improvement in Vehicle-Springs, of which the following is a full, clear, and exact description, reference being had to the accompanying drawings, forming part of this specification.

My invention relates to certain improvements in springs and their attachments for use on vehicles, such as carts, buggies, carriages, and the like; and my invention consists of features of novelty hereinafter fully described, and pointed out in the claims.

Figure I is a bottom view showing the body and a portion of the running-gear of a vehicle with my improvement applied. Fig. II is an enlarged section taken on line II II, Fig. I, looking in the direction of the arrow. Fig. III is an enlarged vertical section taken on line III III, Fig. II.

Referring to the drawings, 1 represents part of the running-gear of a vehicle, and 2 the body.

3 represents levers secured to the running-gear by means of suitable shackles 4 and secured to the body by means of suitable journal-boxes 5.

I have shown the horizontal or shaft portions 6 of the levers integral—that is to say, the levers 3 are joined by their horizontal portions 6, and this portion 6 is provided, preferably, at its center with a crank 7, (see Fig. II,) to which the spring is made fast.

8 represents a bracket secured to the body 2 and having a projection 9 to receive the inner end of the spring 10 and by which the inner end of the spring is held in place.

11 represents a rod or stem secured to the crank 7 of the portion 6 of the levers and which extends into the spring, as shown in Fig. III. These stems are preferably threaded to receive nuts or washers 12, against which the outer ends of the springs bear, and by adjusting these nuts in or out on the stems the tension of the springs can be regulated.

It will thus be seen that as the body of the vehicle descends the springs 10 will compress or contract and in reacting will expand, and the height of the body at either end can be adjusted by increasing or decreasing the tension of the different springs.

I claim as my invention—

1. The combination of levers having horizontal portions provided with a crank and extending across the body and journaled thereto and provided with right-angled extensions journaled to the gear, a coil-spring, a bracket secured to the body for holding one end of the spring, and a stem journaled to said crank on the horizontal part of the lever for holding the other end of the spring, substantially as set forth, whereby a flexible connection is produced by the spring between said bracket and crank.

2. The combination of the levers 3, having horizontal portions 6, formed with a crank 7, the bracket 8, having a projection 9, the stem 11, secured to the crank, and the coil-spring 10, held by the projection at one end and by the stem at the other end, substantially as set forth.

3. The combination of the levers 3, having horizontal portions 6, formed with a crank 7, the bracket 8, having a projection 9, the screw-threaded stem 11, secured to the crank, the nut 12, adjustable on the stem, and the coil-spring 10 between said bracket and said nut, substantially as set forth.

FREDERICK SCHELP, JR.

Witnesses:
 HENRY BORBEIN,
 ROBT. H. TONTRUP.